United States Patent
Tran et al.

(10) Patent No.: US 10,755,536 B2
(45) Date of Patent: Aug. 25, 2020

(54) SYSTEM AND METHOD FOR MANUFACTURE OF A LIGHT REFLECTING ANTENNA SYSTEM

(71) Applicant: Dell Products, LP, Round Rock, TX (US)

(72) Inventors: Thanh T. Tran, Houston, TX (US); Jason T. Minehart, Cedar Park, TX (US); Timothy R. Graham, Round Rock, TX (US); Robert D. Hrehor, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/249,382

(22) Filed: Jan. 16, 2019

(65) Prior Publication Data

US 2020/0226891 A1    Jul. 16, 2020

(51) Int. Cl.
| | | |
|---|---|---|
| G08B 5/36 | (2006.01) |
| H01Q 15/14 | (2006.01) |
| H04B 10/43 | (2013.01) |
| H01Q 1/22 | (2006.01) |
| H04W 24/02 | (2009.01) |
| H01Q 21/06 | (2006.01) |

(52) U.S. Cl.
CPC .............. *G08B 5/36* (2013.01); *H01Q 1/2291* (2013.01); *H01Q 15/14* (2013.01); *H01Q 15/148* (2013.01); *H01Q 21/062* (2013.01); *H04B 10/43* (2013.01); *H04W 24/02* (2013.01)

(58) Field of Classification Search
CPC ...... G08B 5/36; H01Q 15/148; H01Q 1/2291; H01Q 15/14; H01Q 21/062; H01Q 1/06; H04B 10/43; H04W 24/02
See application file for complete search history.

(56) References Cited

U.S. PATENT DOCUMENTS

| | | | | |
|---|---|---|---|---|
| 5,917,453 A * | 6/1999 | Uchino | ................. | H01Q 1/242 343/721 |
| 6,130,646 A * | 10/2000 | Jang | ........................ | H01Q 1/06 343/721 |
| 6,215,984 B1 * | 4/2001 | Figueras | ................. | H01Q 1/06 343/702 |

(Continued)

*Primary Examiner* — Quan-Zhen Wang
*Assistant Examiner* — Rajsheed O Black-Childress
(74) *Attorney, Agent, or Firm* — Prol Intellectual Property Law, PLLC; H. Kenneth Prol

(57) ABSTRACT

An information handling system operating a light reflective antenna comprising a wireless interface device for transmitting and receiving radio signals, via a light reflecting antenna, enclosed within a chassis of the information handling system, the light reflecting antenna comprising a light-reflecting, electrically conductive antenna element adjacent to a light emitting element of the information handling system and a processor executing code instructions to instruct the light reflecting antenna to operate to transceive wireless signals through a light emitting element located between the light reflecting antenna and an exterior surface of the chassis and substantially parallel to the reconfigurable antenna, wherein the light emitting element emits light such that light reflected by the light reflecting antenna is visible and wireless signals may propagate through the same portion of an exterior surface of the chassis.

20 Claims, 7 Drawing Sheets

(56) References Cited

U.S. PATENT DOCUMENTS

| | | | | |
|---|---|---|---|---|
| 6,262,686 B1* | 7/2001 | Delarminat | ............ | H01Q 1/06 |
| | | | | 343/703 |
| 6,292,151 B1* | 9/2001 | Wu | ............ | H01Q 1/06 |
| | | | | 343/702 |
| 6,438,391 B1* | 8/2002 | Wang | ............ | H01Q 1/06 |
| | | | | 343/701 |
| 7,116,279 B1* | 10/2006 | Chan | ............ | H01Q 1/06 |
| | | | | 343/721 |
| 2003/0162558 A1* | 8/2003 | Takase | ............ | H01Q 1/06 |
| | | | | 455/550.1 |
| 2006/0187113 A1* | 8/2006 | Korte, Jr. | ............ | G01S 7/02 |
| | | | | 342/176 |
| 2011/0299299 A1* | 12/2011 | Kim | ............ | G02B 6/0011 |
| | | | | 362/612 |
| 2012/0076116 A1* | 3/2012 | O'Connor | ............ | H01Q 1/08 |
| | | | | 370/338 |
| 2019/0140706 A1* | 5/2019 | Chang | ............ | H04W 24/02 |

\* cited by examiner

Antenna Configuration Table 500

| Configuration | Top Left Antenna Element | Top Right Antenna Element | Bottom Right Antenna Element | Bottom Left Antenna Element |
|---|---|---|---|---|
| Dipole | Left Dipole (Wifi) | Right Dipole (Wifi, BT) | Right Dipole (Wifi, BT) | Left Dipole (Wifi) |
| Monopole 1 | Left Monopole (WiFi) | Right Monopole (WiFi, BT) | OFF | OFF |
| Monopole 2 | OFF | OFF | Right Monopole (WiFi, BT) | Left Monopole (WiFi) |
| Monopole 3 | Top Monopole (WiFi) | OFF | OFF | Bottom Monopole (WiFi, BT) |
| Monopole 4 | OFF | Top Monopole (WiFi) | Bottom Monopole (WiFi, BT) | OFF |
| Monopole 5 | Top Monopole (WiFi) | OFF | Bottom Monopole (WiFi, BT) | OFF |
| Monopole 6 | OFF | Top Monopole (WiFi) | OFF | Bottom Monopole (WiFi, BT) |

FIG. 5

SYSTEM AND METHOD FOR MANUFACTURE OF A LIGHT REFLECTING ANTENNA SYSTEM

FIELD OF THE DISCLOSURE

The present disclosure generally relates to a radio frequency antenna systems incorporated within chasses of information handling systems. The present disclosure more specifically relates to an apparatus of a light reflecting antenna for use with a lighting system and method and apparatus for adaptively configuring a plurality of light reflecting radio frequency antennas within a chassis.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of Wi-Fi, and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a block diagram illustrating an antenna configuration table according to an embodiment of the present disclosure;

The use of the same reference symbols in different drawings may indicate similar or identical items.

DETAILED DESCRIPTION OF THE DRAWINGS

Figure 1:
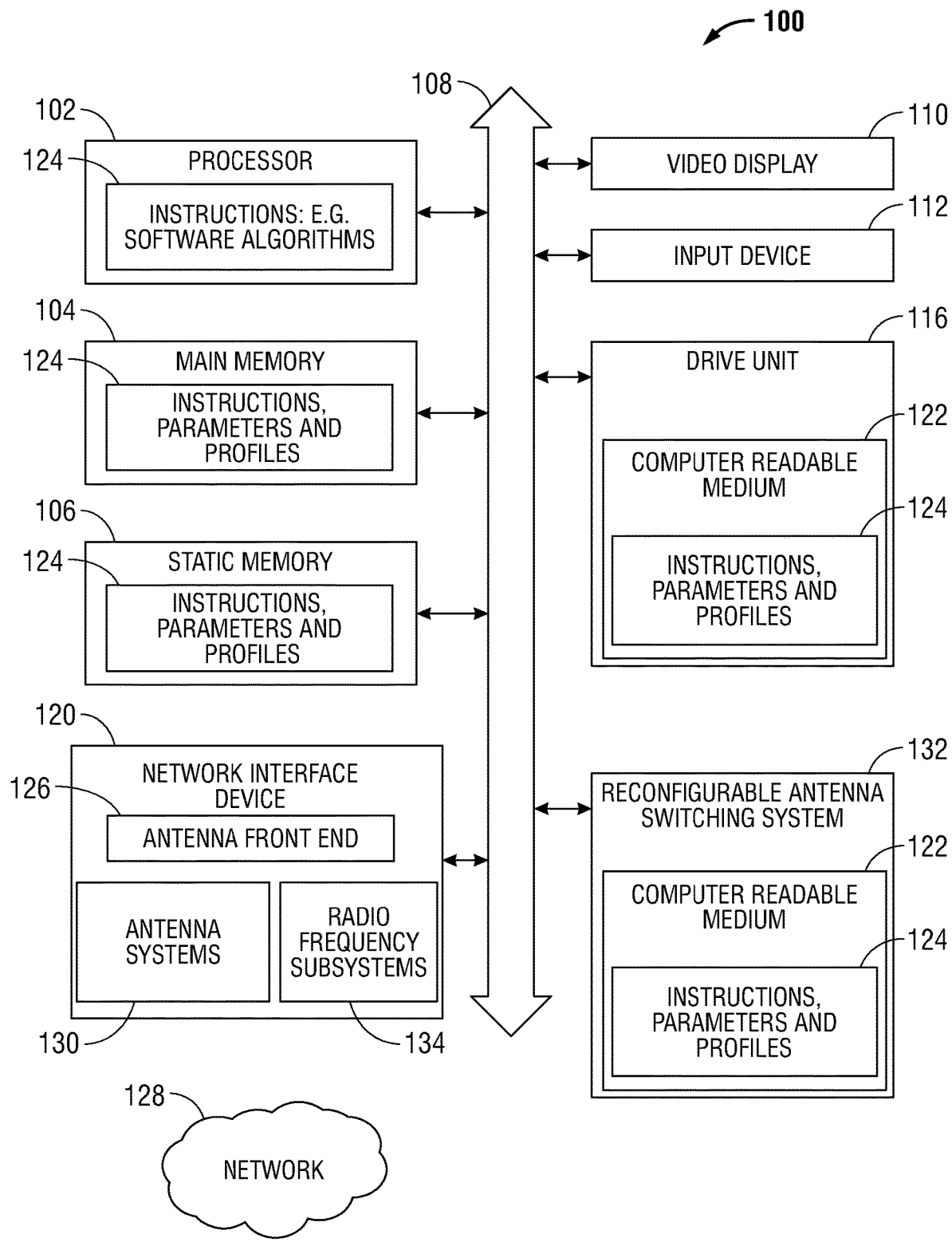
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As reliance on access to the internet and wirelessly connected peripheral devices increases, a need for reliable wireless access at information handling systems correspondingly increases. Placement of radio frequency antennas providing wireless connectivity (e.g. through Wi-Fi or Bluetooth) within an information handling system may drastically impact the quality of signals transmitted and received at such antennas. Further, market forces are driving toward information handling system chasses of ever-decreasing dimensions. As such, space for each component within an information handling system chassis is increasingly limited. Thus, any solutions that decrease the number of components incorporated within a chassis resulting in a simpler and potentially smaller size over potential competitors. This may be particularly true for embodiments wherein a light reflecting antenna system may be used with lighting elements in a mobile information handling system such as a laptop, tablet, or similar information handling system. Moreover, aesthetic requirements may require minimal structures on a chassis and a chassis of an information handling system to be made of metal having radio frequency signal interfering properties. These chassis materials may place restrictions on placement of antenna systems or may require antenna windows made of radio frequency transparent materials such as acrylics or plastics to be embedded or placed in a metallic chassis.

Some information handling system chasses emit light whose color may be custom-chosen by each user. In previous systems, such light is emitted by a pipe of light emitting diodes (LEDs) within the chassis, and is reflected by a reflective material toward one or more openings in an outer face of the chassis. Such reflective material represents an additional component taking up limited space within an information handling system chassis. A solution is needed that simultaneously minimizes the number of components within an information handling system chassis and provides for quality communication signals at the transceiving antenna(s) incorporated within the chassis.

The light reflecting antenna system of the embodiments of the present disclosure addresses some of these issues. Further, reconfigurability of antenna elements of the light reflecting antenna system and reconfigurable antenna switching system of embodiments of the present disclosure addresses additional considerations. First, embodiments of the present disclosure place a light reflecting antenna adjacent to the LED pipe within the information handling system chassis such that the antenna reflects the light toward openings within the faces of the chassis operates as an antenna as well. This obviates the need for an additional reflective component (e.g. Mylar ring, or aluminum or copper sheet), thus resulting in minimized components used in assembling the information handling system and chassis. In addition, placement of the antenna in such a position within the chassis allows radio frequency communications to reach the antenna through the openings in the faces of the chasses through which light from the LED pipe is also emitted with a need for additional opening or radio frequency windows. LED pipe material, light guide material, and covering may be made of acrylics, plastics or other radio frequency transparent materials for example while also providing for partial, diffused, or full transmission of light. In contrast, antennas in prior art systems may have received radio frequency signals passing through the outer faces of the information handling system chassis or requiring non-optimal location of antennas, thus decreasing the quality of such signals or utilizing unsightly plastic vias for antenna transmission and reception.

Second, a reconfigurable antenna switching system of embodiments of the present disclosure may adaptively reconfigure a plurality of antenna elements within the light reflecting antenna in order to increase the quality of transceived signals. For example, in embodiments employing a plurality of antenna elements, a light reflecting reconfigurable antenna may be used such that it may be configured as one or more dipole antennas, or in various configurations of monopole antennas. The reconfigurable antenna switching system in embodiments may adaptively rotate the plurality of antenna elements through the variety of available antenna configurations until an optimal configuration is identified. In such a way, embodiments of the present disclosure may simultaneously increase the quality of wireless communications of which an antenna system enclosed within an information handling system chassis is capable, and decrease the number of components within the chassis.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the reconfigurable antenna switching system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input. The information handling system 100 can also include a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection in various embodiments, however a wireless connection to network 128 is depicted. Wireless adapter 120 may include one or more radio frequency systems and subsystems in support of wireless communications. The wireless interface adapter 120 may include, for example, transmitter/receiver circuitry, modem circuitry, one or more radio frequency front end circuits 126, one or more wireless controller circuits, amplifiers, antenna systems 130 and other radio frequency subsystem circuitry 134 for wireless communications via multiple radio access technologies. Each radio frequency front end 126, antenna system 130, and radio frequency subsystem 134 may communicate with one or more wireless technology protocols. The radio frequency subsystem 134 may contain individual subscriber identity module (SIM) profiles for each technology service provider and their available protocols for subscriber based radio access technologies such as cellular LTE communications. The wireless adapter 120 may also include antenna systems 130, such as light reflecting antenna systems of the embodiments herein and which may be tunable antenna systems for use with the system and methods disclosed herein. In some embodiments a network interface device 120 may contain plural antenna systems 130.

In some aspects of the present disclosure, one wireless adapter 120 may operate two or more wireless links, and up to four wireless links, or one wireless link per antenna. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Other shared communication frequency bands are contemplated for use with the embodiments of the present disclosure as well.

In other aspects, the information handling system 100 may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The proximity of concurrent radio transmission or reception in a shared band or interfering bands precipitates a need to assess concurrently operating antenna systems and potentially make antenna system adjustments as necessary.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac/ad/ax (e.g., center frequencies between 5.170-5.785 GHz), and in the 60 GHz and 80 GHz bands such as 802.11ad. It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 130 for 5G small cell WWAN, Wi-Fi WLAN or WiGig connectivity and one or more additional antenna system transmitters 130 for macro-cellular communication. The radio frequency front end 126 and subsystems 134 include wireless controllers to manage signal reception, amplification, modulation/demodulation, mixing, authentication, connectivity, communications, power levels for transmission, buffering, error correction, baseband processing, and other functions of the wireless adapter 120 according to various protocols.

The radio frequency subsystems 134 of the wireless adapters may also measure various metrics relating to wireless communication pursuant to operation of an antenna optimization system as in the present disclosure. For example, the wireless controller of a radio frequency subsystem 134 may manage detecting and measuring received signal strength indicators (RSSI), data rate, number of lost packets, bit error rates, signal to noise ratios, latencies, jitter, and other metrics relating to signal quality and strength. In one embodiment, a wireless controller of a wireless interface adapter 120 may manage one or more radio frequency subsystems 134.

The wireless network may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer based functions disclosed herein. For example, instructions 124 may execute a reconfigurable antenna switching system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include WinAPIs (e.g. Win32, Win32s, Win64, and WinCE), Core Java API, or Android APIs.

The disk drive unit 116 and the reconfigurable antenna switching system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the reconfigurable antenna switching may be stored here. In a particular embodiment, the instructions, parameters, and profiles 124 may reside completely, or at least partially, within the main memory 104, the static memory 106, and/or within the disk drive 116 during execution by the processor 102 of information handling system 100. In another embodiment, the instructions, parameters, and profiles 124, and/or the reconfigurable antenna switching system 132 may reside completely, or at least partially within the network interface device 120. As explained, some or all of the reconfigurable antenna switching system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The reconfigurable antenna switching system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a reconfigurable antenna switching system 132 that may be operably connected to the bus 108. In one embodiment, the processor 102 may execute code instructions of the reconfigurable antenna switching system 132. In other embodiments, the reconfigurable antenna switching system 132 in an embodiment may be executed by the network interface device 120. The reconfigurable antenna switching system 132 computer readable medium 122 may also contain space for data storage. The reconfigurable antenna switching system 132 may perform tasks related to configuring a plurality of antenna elements within a light reflecting antenna that is reconfigurable to minimize noise or interference of signals transceived by the light reflecting reconfigurable antenna.

In an embodiment, the reconfigurable antenna switching system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
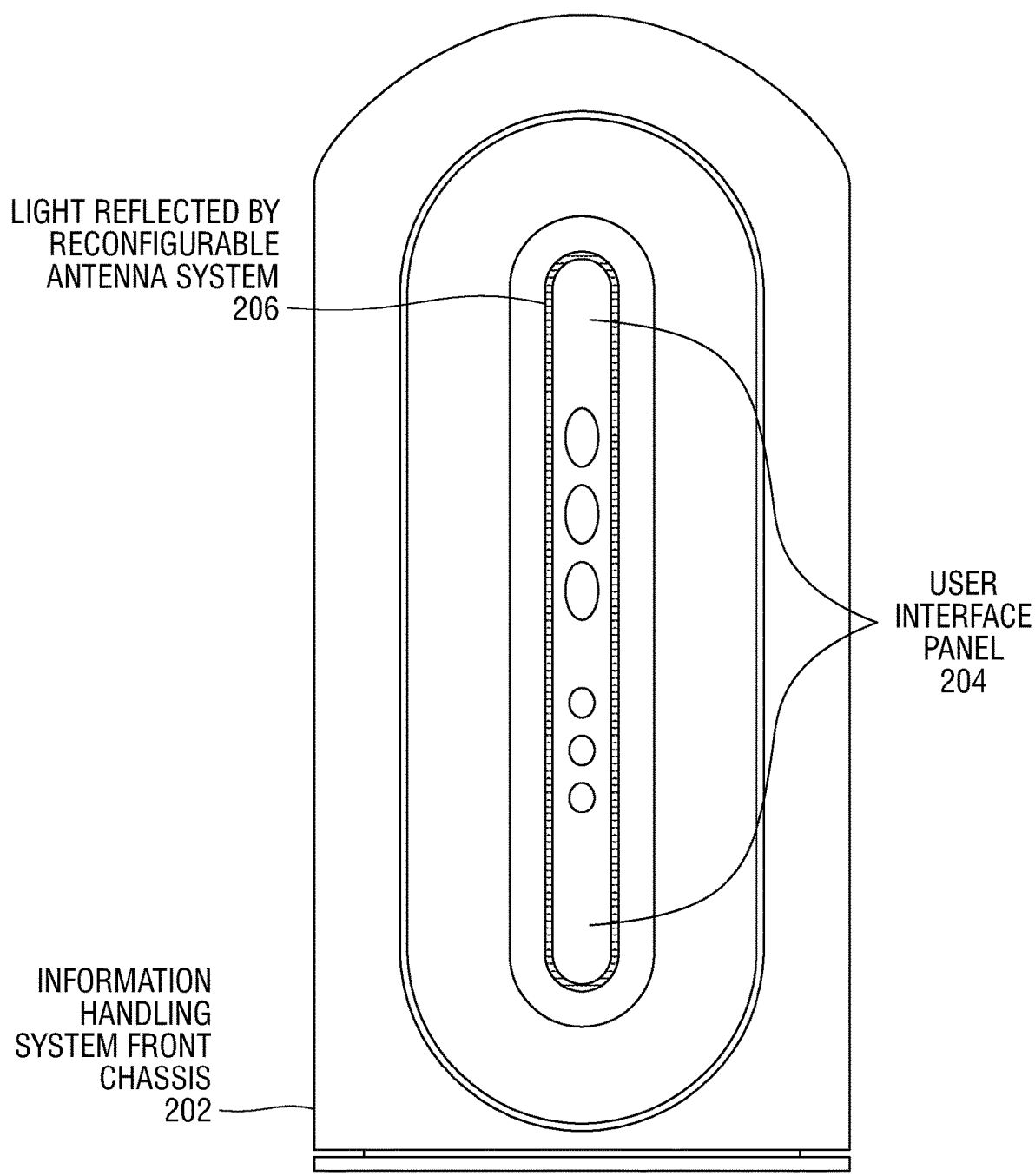
FIG. 2 is a graphical diagram of an information handling system chassis according to an embodiment of the present disclosure.

FIG. 2 is a graphical diagram of a front view of an information handling system chassis emitting light reflected by a light reflecting antenna according to an embodiment of the present disclosure. The front face of an information handling system chassis 202 in an embodiment may include a user interface panel 204. Such a user interface panel 204 may include various buttons (e.g. power button) or indicators the user may interact with or view during operation of the information handling system.

The front face 202 may further emit light 206 through one or more openings in the chassis front face 202. In an embodiment shown in FIG. 2, such openings through which light may be emitted may be located nearby or surrounding the borders of the user interface panel 204. In other embodiments, such openings may be located on any of the exterior faces of the chassis, such that the light is viewable by a user. For example, the light may be emitted from openings on the top, bottom, front, back, left-side, or right-side of the chassis. Further, such openings may be located on more than one of such faces, or on corners where such faces join one another.

The light emitted through such openings in an embodiment may have a color specified by the user. For example, the LED pipe or other light emitting device emitting the light observed by a user through the chassis may be capable of emitting light of various colors (e.g. within the 256 colors of the 8-bit color scheme). The user may choose the color of light emitted by such an LED pipe or other light emitting device via the information handling system processor in an embodiment. The LED pipe or other light emitting device in an embodiment may then emit light at such specified color, and a light reflecting antenna may reflect such light back toward the opening in the front face of the chassis 202 such that the user may view the light 206.

Although, the light reflecting antenna system is described in embodiments herein with a desktop information handling system having a lighting system with a light emitting element such as a light pipe emitting reflected light of a light reflective antenna system 206, it will be understood in the art that a light reflective antenna system may be used with any variety of information handling systems including laptop information handling systems or other mobile information handling system with limited chassis space. Such system may have light emitting elements for aesthetic or other purposes.

Figure 3:
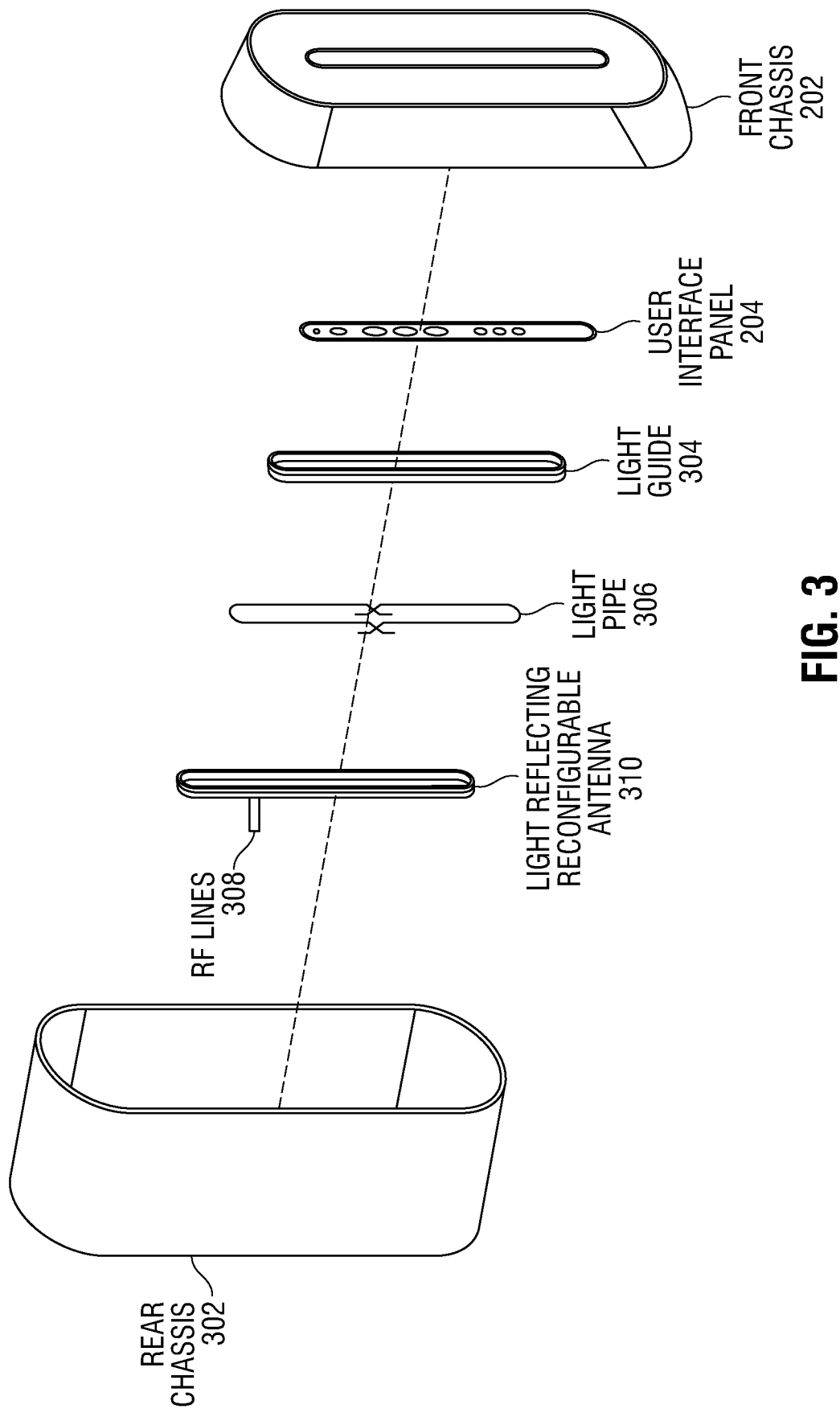
FIG. 3 is a graphical diagram illustrating an exploded view of the light reflecting antenna within the information handling system chassis according to an embodiment of the present disclosure.

FIG. 3 is a graphical diagram illustrating an exploded view of a plurality of components including the light reflecting antenna and LED pipe within the information handling system chassis according to an embodiment of the present disclosure. The information handling system chassis in an embodiment may include the front chassis face 202, which may be joined with the rear chassis 302 to form a chassis fully enclosing the information handling system an each of its components. Such components may include the light reflecting antenna 310, the light guide 304, the LED pipe 306, and radio frequency (RF) lines 308. Further, the user interface panel 204 may be incorporated within an opening of the front chassis 202 such that a user may access it by touch when the front chassis 202 is joined with the rear chassis 302.

The light reflecting antenna 310 in an embodiment which may be reconfigurable in some embodiments may include a plurality of antenna elements comprised of a metallic or other highly reflective, electrically conductive material. Such material may comprise at least the front face of the light reflecting antenna 310. Further, such material may be highly reflective in an embodiment, such that a majority of light reaching the material from the light pipe 306 is reflected back toward the front chassis 202.

The light pipe 306 in an embodiment may be placed between the light reflecting antenna 310, and the front chassis 202. The light pipe 306 may be any light emitting device. For example, the light pipe 306 may include operative connection with or have a plurality of LEDs arranged in an ovular pipe formation, as shown in FIG. 3. In such an embodiment, the LEDs may include a plurality of sub-pixels or varied LED light sources allowing the LEDs to emit light according to red, green, blue (RGB) color schemes, cyan, yellow, magenta, black, (CYMK) color schemes, or other color schemes. In other embodiments, the light pipe 306 may include a single light source (e.g. LED or incandescent bulb). For example, the LEDs within the light pipe 306 illustrated in FIG. 3 may have RGB elements such as pixels capable of emitting one of 256 different colors associated with the 8-bit RGB color scheme. In still other embodiments, the light pipe 306 may include a plurality of LEDs arranged in non-ovular formations (e.g. circle, square, star shape), or may be dispersed across an area and not incorporate the form of a light pipe. Light emitted by the light pipe 306 in an embodiment may be emitted toward the front chassis 202, and toward the light reflecting antenna 310, which may then reflect a majority of this light toward the front chassis 202.

A light guide 304 may be placed between the light pipe 306 and the front chassis 202 in an embodiment. Such a light guide 304 may operate to direct light emitted from the light pipe 304 toward one or more openings in the information handling system chassis. Such openings in the information handling system chassis may have a transparent film or plastic covering. For example, in an embodiment in which light is emitted through openings in the front chassis 202, the light guide 304 may operate to direct light emitted from the light guide 304 and light reflected by the light reflecting antenna 310 toward such openings in the front chassis 202. In other embodiments, the light guide 304 may direct such light toward openings in other portions of the front chassis 202, or the rear chassis 302. The light guide 304 may be any type of diffractive diffuser in an embodiment. For example, the light guide 304 may take the form of a plate, or a film, and may include one or more masks, and/or micro-lens arrays. The light guide 304 in an embodiment may be placed behind the user interface panel 204 and may inhibit light from bleeding through the user interface panel 204.

Each of the light reflecting antenna 310, light pipe 306, light guide 304, and user interface panel 204 may be incorporated within the front chassis 202, which may be comprised of a non-metallic material. Placing the light reflecting antenna 310 within the non-metallic front chassis 202 may decrease signal loss encountered if a transceiving antenna was enclosed in a metallic chassis (e.g. rear chassis 302). Placing light reflective antenna 310 behind the light guide 304 and light pipe 306 made of radio frequency transparent material further eliminates a need to incorporate an radio frequency window or create an antenna location within an otherwise metallic chassis. This may thereby further reduce aesthetic interruptions and added components and manufacturing steps to the chassis design in some embodiments. Further, placing the light reflecting antenna 310 within the front chassis 202 may also decrease noise in comparison to previous system transceiving antennas interfered with by other electronic components enclosed nearby such a transceiving antenna within the metallic chassis having limited places to locate the antennas.

As described herein, choice of components incorporated within an information handling system, as well as choice of placement of such components within a chassis may directly impact marketability of such information handling systems. For example, solutions that decrease the number of components incorporated within a chassis may improve aesthetics, reduce manufacturing costs, and result in other advantages. Further, placement of radio frequency antennas may drastically impact the quality of signals transmitted and received at such antennas.

Placement of the light reflecting antenna 310 within the chasses 202 and 302 such that the antenna 310 reflects light emitted by the light pipe 306 obviates the need for an additional reflective component (e.g. Mylar ring, or aluminum or copper sheet) adjacent to the light pipe 306 or another type of light emitting device in an embodiment. In addition, placement of the antenna 310 in an embodiment shown in FIG. 3 allows radio frequency signals to enter the chasses 202 and 302 via the same openings through which light emitted by the light pipe 306 are guided by the light guide 304. Thus, placement of the light reflecting antenna 310 within the chasses 202 and 302 as shown in FIG. 3 may simultaneously decrease the number of components integrated within the chassis and increase quality of wireless communications.

Figure 4:
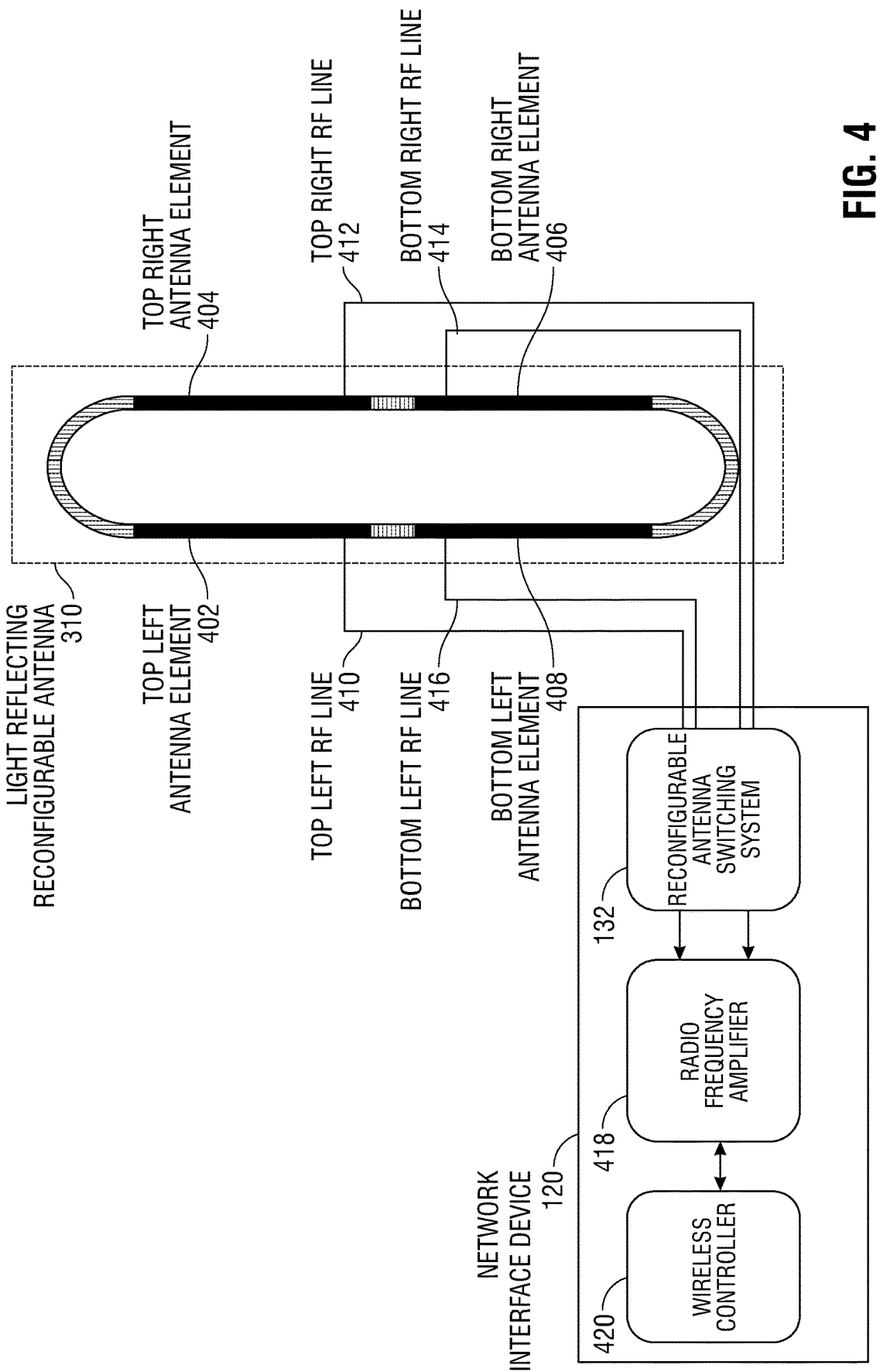
FIG. 4 is a graphical diagram illustrating a light reflecting antenna with reconfigurable antenna elements according to an embodiment of the present disclosure.

FIG. 4 is a graphical diagram illustrating a light reflecting reconfigurable antenna having light reflective capability as well as reconfigurability aspects comprising a plurality of electrically conductive antenna elements according to an embodiment of the present disclosure. The light reflecting reconfigurable antenna 310 of the present embodiment of FIG. 4 may include a plurality of antenna elements that may be configured in various combinations. For example, the antenna 310 in an embodiment may include a top left antenna element 402, a top right antenna element 404, a bottom right antenna element 406, and a bottom left antenna element 408.

Each of the antenna elements 402-408 in an embodiment may be comprised of a highly reflective, electrically conductive material. In some embodiments, each of the antenna elements 402-408 may have a length equivalent to at least the wavelength of transceived signals divided by four. For example, in an embodiment in which the top left antenna element 402 is designed to transceive Wi-Fi signals, the top left antenna element 402 may have a length of at least 1.22 inches. Further, two of the antenna elements 402-408 may be stacked vertically, end to end, on each side (e.g. right side and left side) of the light reflecting reconfigurable antenna 310 as shown in FIG. 4 such that the signals transceived from the antenna 310 are vertically polarized. This vertical polarization caused by the vertical stacking of antenna elements 402-408 in an embodiment may decrease interference encountered by the light reflecting reconfigurable antenna 310 when it is placed within a home or work environment. For example, many televisions transceive along horizontally polarized signals and may cause interference with other horizontally polarized antenna elements in some aspects.

Antenna elements 402-408 may be operably connected to the reconfigurable antenna switching system 132 via a plurality of radio frequency (RF) lines in an embodiment. For example, the reconfigurable antenna switching system 132 may be operably connected to the top left antenna element 402 via the top left RF line 410, to the top right antenna element 404 via the top right RF line 412, to the bottom right antenna element 406 via the bottom left RF line 414, and to the bottom left antenna element 408 via the bottom left RF line 416. RF lines 410-416 may be comprised of an electrically conductive material, and may operate to transmit electrical signals (e.g. radio frequency signals) between the antenna 310 and the reconfigurable antenna switching system 132. Antenna elements 402-408 may transmit or receive RF signals upon receipt of current via their respective RF lines. Antenna elements 402-408 may be made of conductive and light reflective metallic materials such as described with respect to various embodiment herein.

The reconfigurable antenna switching system 132 in an embodiment may include one or more electronic switches and machine executable code instructions operating on a controller, such as an RF controller, an ASIC, or controlled via software or drivers. The machine executable code instructions may direct the flow of current toward one or more of the RF lines 410-416. For example, each of the RF lines 410-416 may be operably connected to such an electronic switch such that the reconfigurable antenna switching system 132 may dictate which of the plurality of RF lines 410-416 are receiving current. Because only antenna elements receiving current from their respective RF line can receive or transmit RF signals, the reconfigurable antenna switching system 132 may control which of the antenna elements 402-408 are operating to receive or transmit RF signals at a given time. As described herein, the reconfigurable antenna switching system 132 in an embodiment may adaptively reconfigure the plurality of antenna elements 402-408 in order to increase the quality of transceived signals by selection among antenna configurations to tune antenna elements 402-408. For example, the antenna elements 402-408 may be configured such that the light reflecting reconfigurable antenna 310 acts as a dipole antenna, or as one of a plurality of monopole antennas. In some embodiments, the reconfigurable antenna switching system 132 may operate within the network interface adapter 120. In other embodiments, the reconfigurable antenna switching system 132 may be operably connected to the network interface adaptor 120 via a bus.

Further, the reconfigurable antenna switching system 132 in an embodiment may control the type of RF signals transceived at each of the antenna elements 402-408. For example, each antenna element 402-408 in an embodiment may be capable of transceiving one or both of Wi-Fi signals and Bluetooth signals. In other embodiments, some of the antenna elements 402-408 may be capable of transceiving according to only one of these types of signals, while others may be capable of transceiving both. In an embodiment described in greater detail with reference to FIG. 5, the reconfigurable antenna switching system 132 may direct the antenna 310 to operate as a dipole by causing the top right 404 and bottom right 406 antenna elements to transceive both Wi-Fi and Bluetooth signals, and causing the top left 402 and bottom left 408 antenna elements to transceive only Wi-Fi signals. In another embodiment, the reconfigurable antenna switching system 132 may direct the antenna 310 to operate as a right/left monopole by causing the top left 402 antenna element or the bottom left 408 antenna element to transceive Wi-Fi signals, and causing the top right 404 or bottom right 406 antenna element to transceive Wi-Fi and Bluetooth signals. In yet another embodiment, the antenna 310 may operate as a top/bottom monopole if the reconfigurable antenna switching system 132 causes the top left 402 or top right 404 antenna element to transceive Wi-Fi signals, and causes the bottom right 406 or bottom left 408 antenna elements to transceive Wi-Fi and Bluetooth signals. Other radio frequency communication signals may also be utilized with the light reflective reconfigurable antenna system 310 and antenna elements 402-408 in other embodiments. For example, mobile information handling systems may utilize any of the radio frequency communication bands described in embodiments herein including LTE, near-field wireless communications, eNodeB small cell communication, IoT communication bands, and others regularly used with information handling systems.

Because each of the antenna elements 402-408 have a different placement within the chassis of the information handling system and with respect to one another, the quality of wireless signals transceived via each of these configurations may vary. The information handling system in an embodiment may monitor signal quality by measuring a plurality of quality of service QoS metrics (e.g. relative signal strength indicator (RSSI), data rate, latency, number of lost packets) for RF signals transceived by the antenna 310. Different configurations of the antenna elements 402-408 may result in different measurements for one or more of these QoS metrics. Further, QoS metrics for a wireless signal transceived by the antenna 310 in a given configuration may vary over time due to changing conditions of the surrounding environment. Still further, one configuration of the antenna elements 402-408 may be associated with an improved measurement of one QoS measurement (e.g. higher RSSI, or higher data rate) in comparison to other configurations, and also associated with a worsened measurement of another QoS measurement (e.g. higher latency or higher number of lost packets).

The reconfigurable antenna switching system 132 in an embodiment may determine which configuration to employ by a plurality of methods, due to the variability of factors impacting signal quality in an embodiment. For example, the reconfigurable antenna switching system 132 may identify the optimal configuration that maximizes or minimizes a specific QoS measurement in comparison to the other configurations in an embodiment. In other embodiments, the reconfigurable antenna switching system 132 may compare the measurements of a plurality of QoS metrics, where each of the metrics is weighted according to importance. In some embodiments, the reconfigurable antenna switching system 132 may perform such an identification when one or more QoS metrics for a current configuration drops below a threshold value. In other embodiments, the reconfigurable antenna switching system 132 may routinely rotate through each of the available configurations in order to identify an optimal configuration.

Once the reconfigurable antenna switching system 132 in an embodiment has identified a configuration for the antenna elements 402-408, it may transmit an identification of that configuration to the radio frequency amplifier 418 of the network interface adapter 120. The radio frequency amplifier 418 in an embodiment may operate to convert a low-power radio frequency signal into a higher power signal for transmission via the light reflecting reconfigurable antenna 310. The radio frequency amplifier 418 may also control one or more of the gain, power output, bandwidth, power efficiency, intensity, input and output impedance matching, and/or heat dissipation of the light reflecting reconfigurable antenna 310. The choice between the different configurations of the light reflecting reconfigurable antenna 310 may impact the ways in which the radio frequency amplifier 418 manages one or more of these factors. For example, the radio frequency amplifier 418 may increase the gain of the light reflecting reconfigurable antenna 310 when it is operating as a dipole antenna in comparison to when the antenna 310 is operating as a monopole antenna. The radio frequency amplifier 418 may adjust the values of one or more of these factors based on the identification of the configuration for the light reflecting reconfigurable antenna 310 as received from the reconfigurable antenna switching system 132 in an embodiment.

The radio frequency amplifier 418 in an embodiment may receive signals for transmission via the light reflecting reconfigurable antenna 310 from a wireless controller 420 such as a wireless local area network (LAN) controller or a Bluetooth controller in some embodiments. The wireless controller 420 may operate to direct communications of the information handling system within wireless networks such as, for example, Wi-Fi, Bluetooth, LTE, or other wireless networks according to various embodiments herein. The wireless controller 420 in an embodiment may be incorporated within the network interface device 120, or may be operably connected to the network interface device 120 via a bus of the information handling system.

FIG. 5 is a block diagram illustrating an example antenna configuration table for controlling the configuration of a plurality of antenna elements according to an embodiment of the present disclosure. As described herein, the light reflecting reconfigurable antenna switching system may adaptively reconfigure the plurality of antenna elements in an embodiment in order to increase the quality of transceived signals. For example, the antenna elements may be configured such that the light reflecting reconfigurable antenna acts as a dipole antenna, or as one of a plurality of monopole antennas.

The antenna configuration table 500 in an embodiment may associate each configuration (e.g. dipole) with a status for each of the antenna elements (e.g. top left element, top right element, bottom right element, and bottom left element) of the light reflecting reconfigurable antenna. As shown in the left-most column of the table 500, in an embodiment in which the light reflecting reconfigurable antenna includes four antenna elements, the antenna elements may be configured to operate in a dipole configuration, or in one of six different monopole configurations. It is contemplated that any plurality of antenna elements may be used with the light reflecting antenna in various embodiments. In the presently-depicted embodiment of FIG. 4 and FIG. 5, four elements are described. In other embodiments, the light reflecting reconfigurable antenna may include a number of antenna elements other than four (e.g. two, six, eight, etc.) including fewer or more antenna elements that may be implemented including a single antenna element as the light reflecting portion of the light generating element in some embodiments. In such embodiments, the table 500 may include a greater or fewer number of dipole and/or monopole configurations. For example, in an embodiment that incorporates only two antenna elements, only one monopole configuration may be available. As another example, in an embodiment that incorporates eight antenna elements, a plurality of dipole configurations may be available.

As described herein, the configuration of the antenna elements may dictate which antenna elements transceive and the type of RF signals transceived at each of the antenna elements. As shown in row 502 of table 500, in an embodiment incorporating four antenna elements operating as a dipole antenna, the left-sided antennas may operate as a left dipole to transceive a Wi-Fi signal while the right-sided antenna elements may operate as a right dipole to transceive both a Wi-Fi and Bluetooth signal. For example, in an embodiment described with reference to FIG. 4, the reconfigurable antenna switching system 132 may direct the light reflecting reconfigurable antenna 310 to operate as a dipole by causing the top left 402 and bottom left 408 antenna elements to transceive Wi-Fi signals while causing the top right 404 and bottom right 406 antenna elements to transceive both Wi-Fi and Bluetooth signals.

In another embodiment, the reconfigurable antenna switching system 132 may direct the antenna 310 to operate as a right/left monopole. For example, as shown in row 504, the reconfigurable antenna switching system 132 may direct the antenna 310 to operate as a right/left monopole by causing the top left 402 antenna element to operate as the left monopole transceiving Wi-Fi signals while causing the top right 404 antenna element to operate as the right monopole transceiving both Wi-Fi and Bluetooth signals. The reconfigurable antenna switching system 132 in such an embodiment may set the RF lines 414 and 416 to stop delivering current, placing the bottom left 408 and bottom right 406 antenna elements in an off position. As another example, as shown in row 506, the reconfigurable antenna switching system 132 may direct the antenna 310 to operate as a different right/left monopole by causing the bottom left 408 antenna element to operate as the left monopole transceiving Wi-Fi signals while causing the bottom right 406 antenna element to operate as the right monopole transceiving both Wi-Fi and Bluetooth signals. The top left 402 and top right 404 antenna elements in such an embodiment may be set to an off state.

In yet another embodiment, the antenna 310 may operate as a top/bottom monopole. For example, as shown in row 508, the reconfigurable antenna switching system 132 may direct the antenna 310 to operate as a top/bottom monopole by causing the top left 402 antenna element to operate as the top monopole transceiving Wi-Fi signals while causing the bottom left 408 antenna element to operate as the bottom monopole transceiving both Wi-Fi and Bluetooth signals. The top right 404 and bottom right 406 antenna elements in such an embodiment may be set to an off state. As another example, as shown in row 510, the reconfigurable antenna switching system 132 may direct the antenna 310 to operate as another top/bottom monopole by causing the top right 404 antenna element to operate as the top monopole transceiving Wi-Fi signals while causing the bottom right 406 antenna element to operate as the bottom monopole transceiving both Wi-Fi and Bluetooth signals. The reconfigurable antenna switching system 132 in such an embodiment may set the top left 402 and bottom left 408 antenna elements to an off state. As yet another example, as shown in row 512, the reconfigurable antenna switching system 132 may direct the antenna 310 to operate as another top/bottom monopole by causing the top left 402 antenna element to operate as the top monopole transceiving Wi-Fi signals while causing the bottom right 406 antenna element to operate as the bottom monopole transceiving both Wi-Fi and Bluetooth signals. The top right 404 and bottom left 408 antenna elements in such an embodiment may be set to an off state. As still another example, as shown in row 514, the reconfigurable antenna switching system 132 may direct the antenna 310 to operate as another top/bottom monopole by causing the top right 404 antenna element to operate as the top monopole transceiving Wi-Fi signals while causing the bottom left 408 antenna element to operate as the bottom monopole transceiving both Wi-Fi and Bluetooth signals. The reconfigurable antenna switching system 132 in such an embodiment may set the top left 402 and bottom right 406 antenna elements to an off state.

Figure 6:
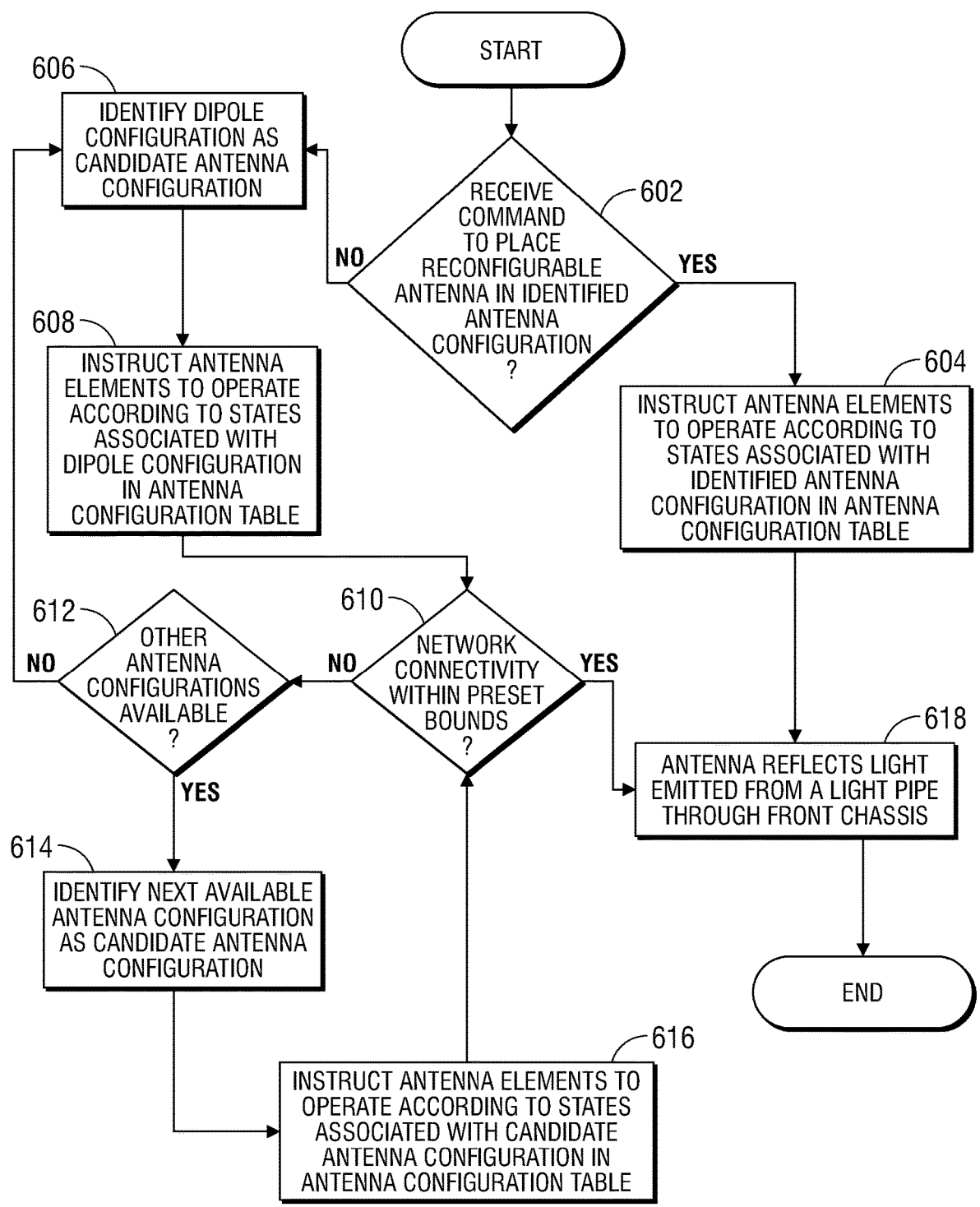
FIG. 6 is a flow diagram illustrating a method of configuring a light reflecting reconfigurable antenna according to an embodiment of the present disclosure.

FIG. 6 is a flow diagram illustrating a method of configuring a plurality of antenna elements of a reconfigurable antenna reflecting light toward an exterior face of an information handling system chassis according to an embodiment of the present disclosure. At block 602, the reconfigurable antenna switching system in an embodiment may determine whether it has received an instruction to place the reconfigurable antenna in an identified antenna configuration. The reconfigurable antenna switching system in an embodiment may receive such a command, for example, if the information handling system is being powered on for the first time. In such a scenario, the information handling system may prompt the reconfigurable antenna switching system to place the antenna in a default configuration for later optimization. The reconfigurable antenna switching system in an embodiment may also receive such a command, for example, if it has received user input indicating a user-selected antenna configuration.

In another example, the information handling system may include a wireless communication optimization module that operates to test quality of service of signals received according to each of the available configurations and to identify a most optimal signal. Such an optimization module or method is outside the scope of this disclosure, but may include, for example, identifying a configuration generating a signal associated with a highest overall quality rank in comparison to other configurations. If such a command is received by the reconfigurable antenna switching system in an embodiment, the method may proceed to block 604. If the reconfigurable antenna switching system in an embodiment has not received an instruction to place the reconfigurable antenna in an identified antenna configuration, the method may proceed to block 606.

In an embodiment in which the reconfigurable antenna switching system has received an instruction to place the light reflecting reconfigurable antenna in an identified antenna configuration, the reconfigurable antenna switching system in an embodiment may instruct the antenna elements of the reconfigurable antenna switching system to operate according one or more states. For example, a plurality of antenna configuration states that may be associated with the identified antenna configuration are illustrated in the antenna configuration table of FIG. 5 and may be used at block 604. As described herein, the reconfigurable antenna switching system in an embodiment may adaptively reconfigure the plurality of antenna elements in order to increase the quality of transceived signals. For example, in an embodiment described with reference to FIG. 4, the reconfigurable antenna switching system 132 may control one or more electronic switches directing the flow of current toward one or more of the RF lines 410-416. For example, each of the RF lines 410-416 may be operably connected to such an electronic switch such that the reconfigurable antenna switching system 132 may dictate which of the plurality of RF lines 410-416 are receiving current. Because only antenna elements receiving current from their respective RF line will receive or transmit, the reconfigurable antenna switching system 132 may control which of the antenna elements 402-408 are operating to receive or transmit RF signals at a given time. Further, the reconfigurable antenna switching system 132 in an embodiment may control the type of RF signals transceived at each of the antenna elements 402-408.

The reconfigurable antenna switching system may determine which of the antenna elements 402-408 should transceive RF signals at a given time, and which type of RF signal should be transceived by each of the antenna elements 402-408 by referencing an antenna configuration table, in an example embodiment. For example, the reconfigurable antenna switching system in one embodiment described with reference to FIG. 5 may access the antenna configuration table 500, and locate the configuration in which the reconfigurable antenna switching system has been commanded to place the antenna at block 502. By referring to the row that includes that configuration, the reconfigurable antenna switching system may then identify the states in which each of the antenna elements may be placed in order to configure the antenna as commanded. The states for each of the antenna elements may dictate whether a given antenna element will be placed in an ON state or an OFF state, and may further dictate the type of RF signals (e.g. Wi-Fi alone, or Wi-Fi and Bluetooth) to be transceived at that antenna element. The reconfigurable antenna switching system in an embodiment may then place each antenna element in the state identified in table 500. The method may then proceed to block 618 in an embodiment. In other embodiments, such as the optional embodiment shown by the dashed line, the method may proceed to block 610 from block 618, where QoS metrics (e.g. RSSI, data rate, latency, lost packets) for the wireless signal transceived by the antenna in the identified configuration may be routinely tested and compared against preset threshold requirements. The selection of an antenna configuration state may be considered for change at 610 by the reconfigurable antenna switching system. Determination of antenna configuration states at block 610 are described further herein.

At block 606, in an embodiment in which the reconfigurable antenna switching system has not received a command to place the antenna in a specific configuration, the reconfigurable antenna switching system may identify one configuration, such as the dipole configuration, as a candidate antenna configuration. If the reconfigurable antenna switching system does not receive a command to place the antenna in a specific configuration, it may proceed to test quality of service for wireless connections established by one or more of the available configurations. For example, in an embodiment, quality of wireless connections established by each of the available configurations may be tested and compared against one another in order to identify an optimal configuration. In another embodiment, the reconfigurable antenna switching system may place the antenna in a default configuration and reconfigure the antenna only when quality of service for the wireless signal established by the default configuration falls below preset threshold values. The reconfigurable antenna switching system may thus identify the dipole configuration as a candidate antenna configuration at block 606 as the first of several configurations that will be tested for quality of service, or as the default configuration. In other embodiments, one of the monopole configurations may be designated as the default configuration, and the reconfigurable antenna switching system.

The reconfigurable antenna switching system in an embodiment may instruct the antenna elements to operate according to states associated with the dipole configuration in an antenna configuration table at block 608. For example, in an embodiment described with reference to FIG. 5, the reconfigurable antenna switching system may instruct each of the antenna elements to operate according to their respective states identified in row 502. As another example, in an embodiment described with reference to FIG. 4, the reconfigurable antenna switching system 132 may direct the light reflecting reconfigurable antenna 310 to operate as a dipole by causing the top left 402 and bottom left 408 antenna elements to transceive Wi-Fi signals while causing the top right 404 and bottom right 406 antenna elements to transceive both Wi-Fi and Bluetooth signals.

At block 610, the reconfigurable antenna switching system in an embodiment may determine whether network connectivity is within preset bounds. As described herein, the reconfigurable antenna switching system may place the antenna in a default configuration at block 608 and reconfigure the antenna only when quality of service for the wireless signal established by the default configuration falls below preset threshold values. In other embodiments, the reconfigurable antenna switching system may place the antenna in a configuration identified through received commands at block 604, and similarly reconfigure the antenna when QoS metrics for the wireless signal established by the instructed configuration falls below preset threshold values.

Returning to block 610, such threshold values may be preset and stored in a memory of the information handling system. Further, such threshold values may include a separate threshold value for each QoS metric measured. For example, such threshold values may include a minimum RSSI (−80 dBm), a minimum data rate (e.g. 20 kbit/s), a maximum latency (e.g. 50 ms), and/or a maximum number of lost packets (e.g. 5%). In an example embodiment, the reconfigurable antenna switching system may test one or more of such QoS metrics at routine intervals in order to determine whether the metrics reach all applicable threshold values. In other embodiments, threshold values may, additionally or in the alternative, include a minimum weighted quality ranking that incorporates each of the QoS metrics measured for a given wireless connection (e.g. RF signal). In other embodiments, the reconfigurable antenna switching system may test quality of service for wireless connections established by one or more of the available configurations and compare measurements for each wireless connection against one another in order to identify an optimal configuration. In such embodiments, block 610 may be skipped.

In an embodiment in which the network connectivity for the current configuration is not within preset bounds, or in which the reconfigurable antenna switching system routinely tests quality of service metrics across all available configurations, it may be determined at block 612 whether other antenna configurations are available. For example, the reconfigurable antenna switching system in an embodiment in which the quality of service metrics have only been analyzed for a dipole configurations may determine by accessing an antenna configuration table that six different monopole configurations are also available. In an embodiment in which other antenna configurations are available, the method may proceed to block 614. If other antenna configurations are not available, this may indicate the antenna is currently placed in the last available monopole configuration shown in the antenna configuration table, and the method may proceed back to block 606, so the antenna may be placed back into the dipole configuration and retested. In another embodiment, if another configuration is not available, this may indicate each of the wireless links established by each of the antenna configurations has been tested, and such QoS metric measurements have been recorded for analysis and comparison. In such a scenario, the reconfigurable antenna switching system in an embodiment may return to block 602, and await reception of a command identifying a most optimal configuration.

At block 614, in an embodiment in which other antenna configurations are available, the reconfigurable antenna switching system may identify a next available antenna configuration as a candidate antenna configuration. For example, in an embodiment in which the antenna is currently set to a dipole configuration, the reconfigurable antenna switching system may identify the first monopole configuration as the candidate antenna configuration. As another example, in an embodiment in which the antenna is currently set to the second monopole configuration, the reconfigurable antenna switching system may identify the third monopole configuration as the candidate antenna configuration.

The reconfigurable antenna switching system in an embodiment may, at block 616, instruct the plurality of antenna elements to operate according to their respective states associated with the candidate antenna configuration identified at block 614 in the antenna configuration table. For example, in an embodiment described with reference to FIG. 5, in which the reconfigurable antenna switching system has identified the first monopole configuration as the candidate antenna configuration, the reconfigurable antenna switching system may instruct the plurality of antenna elements to operate according to their respective states as identified in row 504 of table 500. As another example, in an embodiment in which the reconfigurable antenna switching system has identified the third monopole configuration as the candidate antenna configuration, the reconfigurable antenna switching system may instruct the plurality of antenna elements to operate according to their respective states as identified in row 508 of table 500. As yet another example, in an embodiment described with reference to FIG. 4, in which the reconfigurable antenna switching system has identified the first monopole configuration as the candidate antenna configuration, the reconfigurable antenna switching system may instruct the top left antenna element 402 to transceive Wi-Fi signals alone, instruct the top right antenna element 404 to transceive both Wi-Fi and Bluetooth signals, and place the bottom right 406 and bottom left 408 antenna elements in an OFF state. In yet another example, in an embodiment in which the reconfigurable antenna switching system has identified the third monopole configuration as the candidate antenna configuration, the reconfigurable antenna switching system may instruct the top left antenna element 402 to transceive Wi-Fi signals alone, instruct the bottom left antenna element 408 to transceive both Wi-Fi and Bluetooth signals, and place the bottom right 406 and top right 404 antenna elements in an OFF state. Upon operating on the next available antenna configuration, flow may return to block 610 for the reconfigurable antenna switching system to assess operation bounds in some embodiments of the current antenna configuration state.

At block 618, in an embodiment in which the antenna elements have been instructed to operate according to a given state in accordance with either block 604, block 608, or block 618, the antenna may transceive one or more wireless signals while reflecting light emitted from a light pipe at an exterior surface of the information handling system chassis. Light may be emitted at 618, regardless of whether any particular antenna configuration has been selected and the order of blocks in FIG. 6 is not necessarily sequential. In embodiments herein, it is contemplated that emitting light from a light pipe and reflecting from a light reflecting antenna may occur simultaneously with transceiving wireless signals via the light reflecting antenna element or elements. For example, in an embodiment described with reference to FIG. 3, the LED pipe 306 may be placed between the light reflecting reconfigurable antenna 310 and a front chassis 202 such that the light reflecting reconfigurable antenna 310 reflects light emitted by the light pipe 306 toward the front chassis 202. In another example described with reference to FIG. 2, the light 206 reflected by the light reflecting reconfigurable antenna 310 may be visible at the front chassis 202 via one or more openings on the front chassis 202. RF signals travelling through such openings in an embodiment to reach the light reflecting reconfigurable antenna 310 may encounter less interference than wireless signals having to travel through the front chassis 202. Thus, the quality of wireless signals received via such openings may be higher than wireless signals of previous systems forced to travel through an exterior chassis or an RF window placed in a separate part of the chassis.

Figure 7:
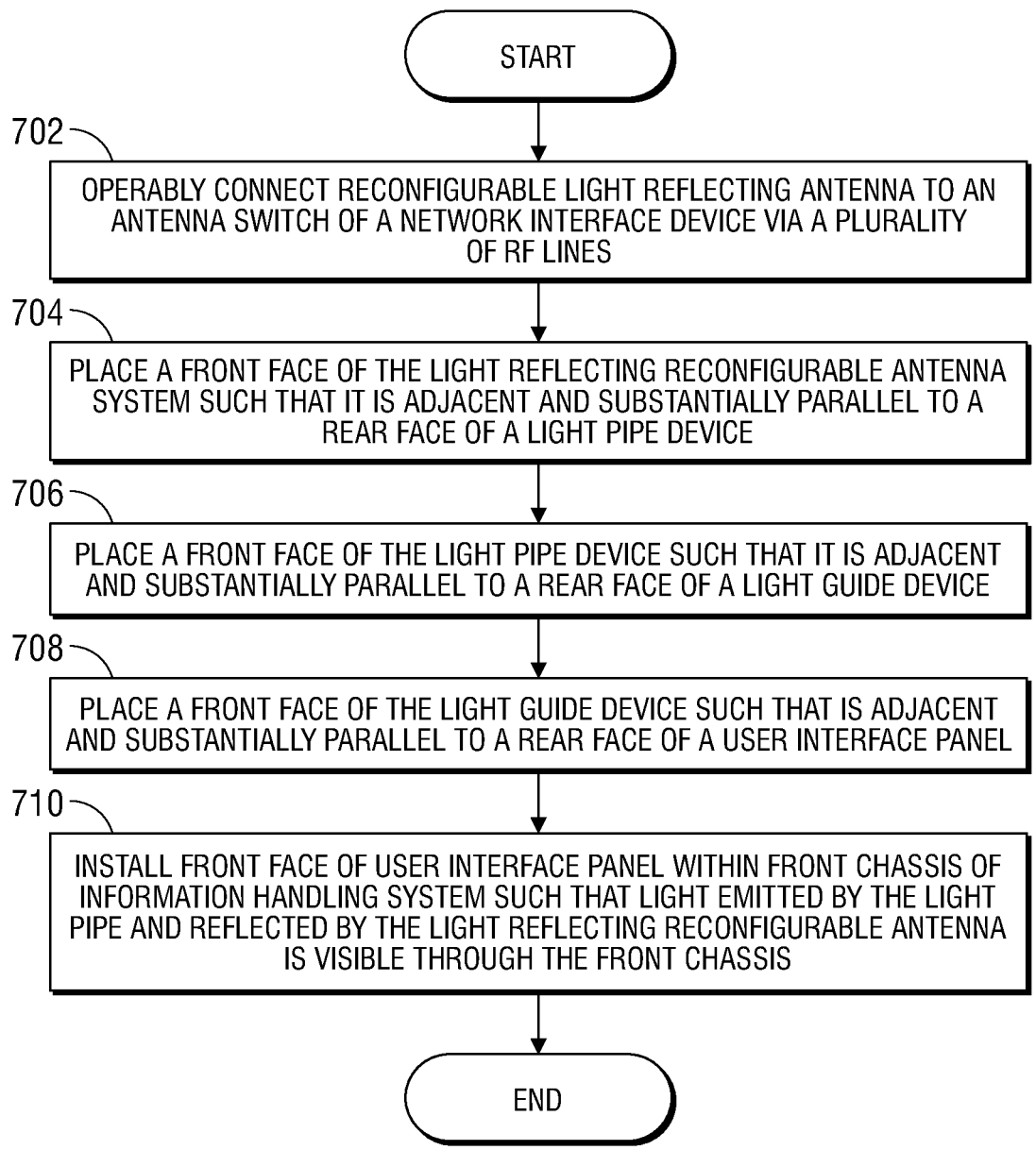
FIG. 7 is a flow diagram illustrating a method of enclosing a light reflective antenna within an information handling system chassis according to an embodiment of the present disclosure.

FIG. 7 is a flow diagram illustrating a method of enclosing a light reflective reconfigurable antenna within an information handling system chassis such that light reflected by the light reflective reconfigurable antenna is visible at an exterior surface of the chassis according to an embodiment of the present disclosure. At block 702, a reconfigurable light reflecting antenna may be operably connected to an antenna switch of a network interface device via a plurality of RF lines. For example, in an embodiment described with reference to FIG. 3, the light reflecting antenna 310 may be operably connected to RF lines 308, which may further connect to a reconfigurable antenna switching system. In another example, in an embodiment described with reference to FIG. 4, a light reflecting reconfigurable antenna 310 which includes reconfigurable antenna elements, may be operably connected to the reconfigurable antenna switch system 132 via a plurality of RF lines 410-416 in some embodiments. More specifically, each of the plurality of RF lines 410-416 in such an embodiment may operably connect one of the antenna elements 402-408 to the reconfigurable antenna switching system 132, which may operate to control the state of each of those antenna elements 402-408.

The front face of the light reflecting antenna in an embodiment may be placed at block 704 such that it is adjacent and substantially parallel to a rear face of a light pipe device. For example, in an embodiment described with reference to FIG. 3, the light pipe 306 in an embodiment may be placed between the light reflecting antenna 310, and the front chassis 202. In other words, a rear portion of the light pipe 306 may be adjacent to a front portion or face of the light reflecting antenna 310. In some embodiments, the front face of the light reflecting antenna 310 may abut the rear face of the light pipe 306. Light emitted by the light pipe 306 in such an embodiment may be emitted toward the front chassis 202, and toward the light reflecting antenna 310, which may then reflect a majority of this light toward the front chassis 202.

At block 706, a light guide device may be placed such that its rear face is adjacent and substantially parallel to the front face of the light pipe. For example, a light guide 304 may be placed between the light pipe 306 and the front chassis 202 in an embodiment described with reference to FIG. 3. Such a light guide 304 may operate to direct light emitted from the light pipe 304 and light reflected by the light reflecting antenna 310 toward one or more openings in the front chassis 202. The light guide 304 may be placed such that its rear face is adjacent and substantially parallel to the front face of the light pipe 306 in an embodiment. In some embodiments, the light guide 304 may be placed such that it abuts the light pipe 306. Light pipe 306 and light guide 304 may be comprised of RF transparent materials including various plastics such as mylar, acrylic, PVC, PFTE or Teflon, polypropylene, polyimides, glass, and various other similar materials such as dielectrics known in the art to have limited loss and through which RF waves may propagate. Thus, light reflecting reconfigurable antennas may transmit and receive wireless signals through propagation of RF waves through light pipe 306 and light guide 304. The materials used may also be partially or fully transparent to light and may, in some embodiments, diffuse the light if desired.

A user interface panel may be placed such that its rear face is adjacent and substantially parallel to the front face of the light guide device at block 708 in an embodiment. For example, in an embodiment described with reference to FIG. 3, the light guide 304 may be placed behind the user interface panel 204. In such an embodiment, the light guide 304 may operate to block light travelling toward the rear of the user interface panel 204. In such a way, the light guide 304 may inhibit light from bleeding through the user interface panel 204.

At block 710, the front face of the user interface panel may be installed within the front chassis of the information handling system such that light emitted by the light pipe and reflected by the light reflecting antenna system is visible at the front chassis. For example, in an embodiment described with reference to FIG. 3, the user interface panel 204 may be incorporated within an opening of the front chassis 202 such that a user may access it by touch when the front chassis 202 is joined with the rear chassis 302. In such an embodiment, the light guide 304 may operate to guide light reflected by the light reflecting antenna 310 toward openings located around the edges of the user interface panel 204. In another example embodiment, the user interface panel 204 may be comprised of a translucent material, and the light guide 304 may guide reflected light through such translucent material. Such reflected light in an embodiment may be visible by the user at an exterior surface of the chassis. For example, in an embodiment described with reference to FIG. 2, the light 206 reflected by the light reflecting antenna may be visible at the surface of the front chassis 202. Such placement of the light reflecting antenna and other components may simultaneously decrease the number of components integrated within the chassis and increase quality of wireless communications.

The blocks of the flow diagrams of FIGS. 6-7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system operating a light reflective antenna comprising:
    a wireless interface device for transmitting and receiving radio signals, via a light reflecting antenna, enclosed within a chassis of the information handling system;
    the light reflecting antenna comprising a light-reflecting, electrically conductive antenna element adjacent to a light emitting element of the information handling system; and a processor executing code instructions to instruct the light reflecting antenna to operate to transceive wireless signals through the light emitting element located between the light reflecting antenna and an exterior surface of the chassis and substantially parallel to a reconfigurable antenna, wherein the light emitting element emits light such that light reflected by the light reflecting antenna is visible and wireless signals may propagate through the same portion of an exterior surface of the chassis.

2. The information handling system of claim 1 further comprising:

the processor directing the light emitting element to emit light having a user-selected 8-bit color, wherein the light emitting element is a light emitting diode with a light pipe.

3. The information handling system of claim 1 further comprising:

the wireless interface device for transmitting and receiving radio signals, via the light reflecting antenna that is the reconfigurable light reflecting antenna;

the reconfigurable light reflecting antenna comprising a plurality of light-reflecting, electrically conductive antenna elements implemented according to one of a plurality of antenna configurations; and the processor executing code instructions of a reconfigurable antenna switching system to instruct the reconfigurable light reflecting antenna to operate in a selected configuration, wherein the selected configuration is one of the plurality of antenna configurations.

4. The information handling system of claim 3 further comprising:

the reconfigurable antenna comprising two electrically conductive antenna elements, wherein the selected configuration includes each of the two electrically conductive antenna elements operating as a monopole.

5. The information handling system of claim 3 further comprising:

the reconfigurable antenna comprising four electrically conductive antenna elements, wherein the selected configuration includes the electrically conductive antenna elements operating as two dipoles.

6. The information handling system of claim 3 further comprising:

the processor identifying the selected configuration by identifying one of a plurality of monopole combinations associated with a highest relative signal strength indicator (RSSI) measurement in comparison to the remaining plurality of antenna configurations.

7. The information handling system of claim 1 further comprising:

a light guide positioned between the light emitting element and the exterior surface of the chassis and comprised of a radio frequency transparent material.

8. A method for configuring a light reflecting reconfigurable antenna comprising:

transcieving wireless signals on a first wireless link from a light reflecting reconfigurable antenna through a radio frequency transparent light emitting element from a chassis of an information handling system;

measuring, via a radio frequency subsystem, a quality of service (QoS) metric for the first wireless link established by a first combination of two or more of a plurality of light-reflecting, electrically conductive antenna elements placed in a first one of a plurality of candidate antenna configurations;

determining the QoS service metric does not meet a preset threshold value;

automatically configuring a second combination of two or more of the plurality of light-reflecting, electrically conductive antenna elements according to a second one of the plurality of candidate antenna configurations; and emitting light via the light emitting element located between the light reflecting reconfigurable antenna and an exterior surface of the chassis such that light is reflected via the light-reflecting electrically conductive antenna toward the same portion of the exterior surface of the chassis as propagation of wireless signals transceived from the light reflecting antenna.

9. The method of claim 8, wherein the second one of the plurality of candidate antenna configurations is one of six candidate monopole configurations.

10. The method of claim 8, wherein the second one of the plurality of candidate antenna configurations includes two pairs of the plurality of light-reflecting, electrically conductive antenna elements each operating as a dipole.

11. The method of claim 8, wherein the QoS metric is RSSI.

12. The method of claim 8, wherein the QoS metric is data rate.

13. The method of claim 8, wherein the QoS metric is latency.

14. The method of claim 8, wherein the QoS metric is a number of lost packets.

15. An information handling system operating a light reflective antenna comprising:

a wireless interface device for transmitting and receiving radio signals, via a light reflecting antenna, enclosed within a chassis of the information handling system;

the light reflecting antenna comprising a plurality of light-reflecting, electrically conductive antenna elements adjacent to a light emitting element of the information handling system;

a processor executing code instructions to instruct the light reflecting antenna to operate to transceive wireless signals through the light emitting element located between the light reflecting antenna and an exterior surface of the chassis and substantially parallel to the reconfigurable antenna, wherein the light emitting element emits light such that light reflected by the light reflecting antenna is visible and wireless signals may propagate through the same portion of an exterior surface of the chassis; and the processor executing code instructions of the reconfigurable antenna switching system to instruct the light reflecting antenna to operate to transceive wireless signals in a selected configuration of the plurality of light-reflecting, electrically conductive antenna elements, wherein the selected configuration is one of the plurality of antenna configurations.

16. The information handling system of claim 15, wherein at least one of the plurality of light-reflecting, electrically conductive antenna elements has a length equivalent to the wavelength of an RF signal transceived divided by four.

17. The information handling system of claim 15 wherein the plurality of antenna configurations includes a dipole configuration and a plurality of monopole configurations.

18. The information handling system of claim 15 further comprising:

the light reflecting antenna comprising four electrically conductive antenna elements, wherein the selected configuration includes the electrically conductive antenna elements operating as two dipoles.

19. The information handling system of claim 15, further comprising:

the processor identifying the selected configuration according to user input.

20. The information handling system of claim 15, further comprising:

the processor identifying the selected configuration by identifying one of the plurality of antenna configurations associated with a RSSI in comparison to the remaining plurality of antenna configurations.

\* \* \* \* \*